No. 731,881.

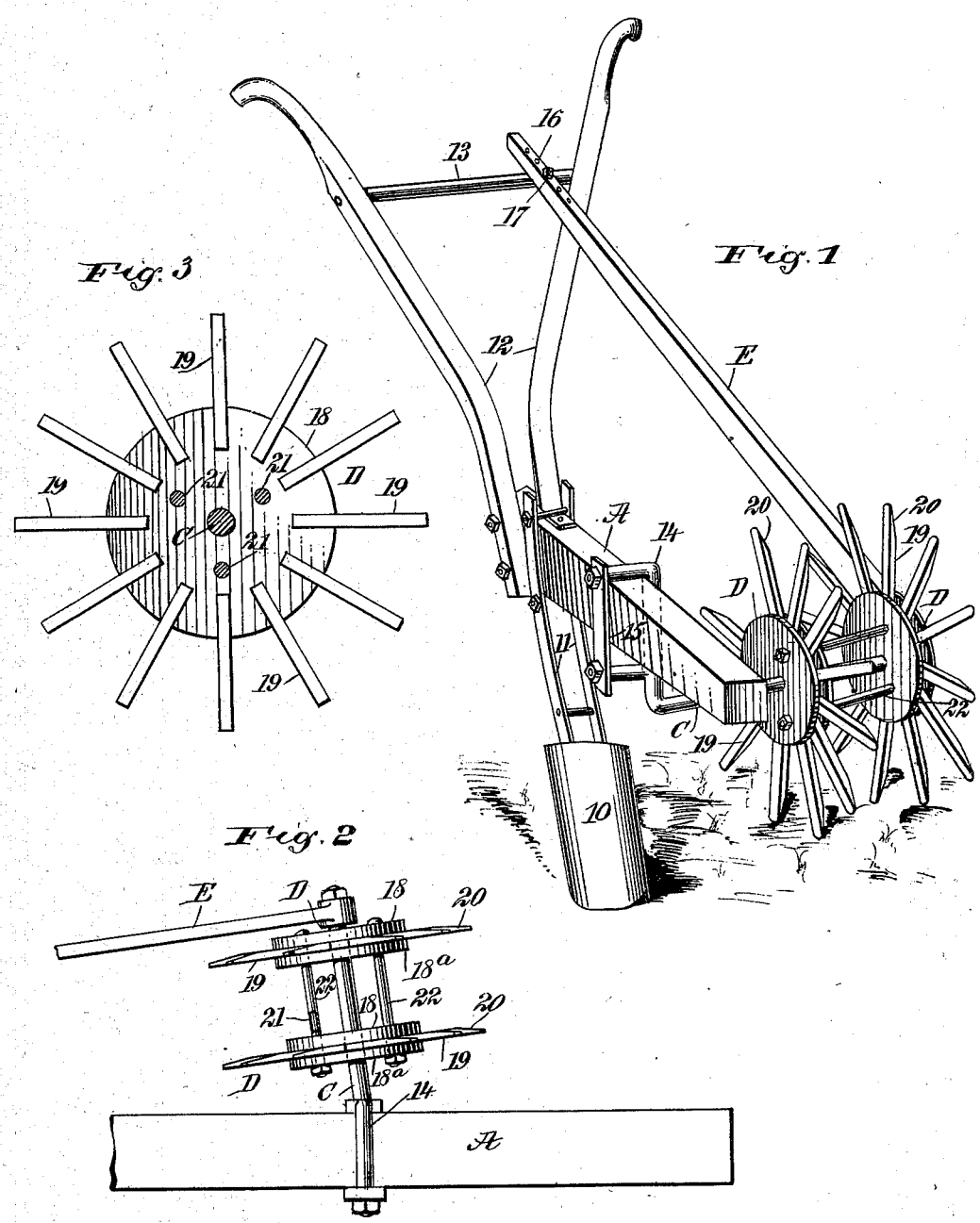

Patented June 23, 1903.

UNITED STATES PATENT OFFICE.

JOHN COLEMAN FOOSHE, OF NINETYSIX, SOUTH CAROLINA.

HARROW ATTACHMENT FOR PLOWS.

SPECIFICATION forming part of Letters Patent No. 731,881, dated June 23, 1903.

Application filed December 9, 1902. Serial No. 134,521. (No model.)

*To all whom it may concern:*

Be it known that I, JOHN COLEMAN FOOSHE, a citizen of the United States, and a resident of Ninetysix, in the county of Greenwood and State of South Carolina, have invented a new and Improved Harrow Attachment for Plows, of which the following is a full, clear, and exact description.

My invention relates to a harrow attachment to cultivator or plow beams; and the purpose of the invention is to provide connected spiked wheels, a support upon which the wheels are mounted to turn, and means for adjustably connecting the support to the plow or cultivator beam, whereby said support may be placed and held at any desired angle to the beam, preferably at more or less of an obtuse angle, whereby as the plow or cultivator advances the spikes of the wheels strike the ground obliquely to the rows of plants, causing the spiked teeth when operating across a row of young plants to thin them out, supplying room for the development of the remaining standing plants, at the same time removing all young weeds and pulverizing the ground to the roots of the plants and the ground turned up by the cultivator-blade or plowshare.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the cultivator and the improved attachment applied. Fig. 2 is a plan view of a portion of the cultivator-beam and the applied attachment; and Fig. 3 is a vertical section through one of the spiked wheels, drawn upon an enlarged scale.

A represents a beam, which in this instance has cultivator-blades 10 attached to it through the medium of suitable supports or standards 11, and at the rear of said beam the customary handles 12 are secured, being connected by an upper cross-bar 13.

The attachment consists of an axle C, adapted to be secured to the aforesaid beam A, spiked wheels D, adapted to turn on the said axle, and an adjusting-bar E, which affords support for the outer end of the axle C and by means of which bar the angularity of the axle C is controlled with reference to the beam A. The main or body portion of the axle C extends below the beam from its right-hand side as far as may be desired beyond its left-hand side, and the left-hand end of the said axle is mounted in the forward or lower end of the adjusting-bar E, whose upper and rear end rests upon the connecting rod or bar 13 for the handles 12. At the right-hand end of the axle C a clip 14 is formed, preferably integral with the axle, and this clip consists usually of an arm carried upward from the body of the axle, at right angles thereto, and two lateral or horizontal arms having sufficient space between them for the admission and passage of the beam A, and a connecting-plate 15, which is secured by suitable nuts to the lateral branches of the said clip. Thus it will be observed that the axle may be adjustably placed on the beam A and be held thereto at any desired angle to the beam. Usually, however, when the clip is placed on the beam A it is left free to be moved at an angle to the beam by the adjustment of the adjusting-bar E, which adjusting-bar at its upper end has a series of apertures 16 produced therein, and a bolt 17, with a suitable nut, is provided, which passes through any one of the apertures 16 and a registering aperture in the connecting rod or bar 13 of the handle. The axle C is held at more or less of an obtuse angle to the side surface of the beam A, so that the spiked wheels D, which are free to turn on the said axle, will move obliquely of the row of plants and across the said row while the beam A of the cultivator or plow is being drawn or pushed in a parallel line with the same row.

Each of the spiked wheels D consists of two disks 18 and 18$^a$ and spikes 19, which are secured at their inner ends in any desired manner between the disks 18 and 18$^a$, extending radially beyond the periphery of the disks a desired distance. Each spike 19 is provided at the left-hand side of its outer end with a beveled surface 20, whereby the outer extremities of the spikes 19 are more or less sharp. The disks of the two wheels are held in position relative to each other, and the spikes may also be held fast between the disks, and the two wheels are connected, preferably, as shown, by means of bolts 21, which pass through the disks of each wheel, having a head at one end and a nut at the other, and tubular washers 22 are located on the bolts 21, having bearing at their ends against the opposing disks of the two wheels, as is particularly shown in Fig. 2; but other means may be employed for assembling and holding the parts of the spiked wheels together and for connecting the said wheels, so that they will simultaneously turn freely on the axle C. It is evident that when the axle C is at an obtuse angle to the beam A, with a rearward inclination at the outer end of the axle, while the beam A of the plow or cultivator may be made to travel parallel with the row of plants the wheels will travel obliquely across the same row, removing and thinning out sundry of the plants, at the same time removing any weeds that may be in the path of the spikes 19 of the wheels, and that the spikes of the said wheels will freshen up the earth, pulverizing it around the roots of the remaining or standing plants, and that the said spikes of the wheels D will at the same time pulverize the earth which is thrown up to the plants by the share or cultivator-blade 10.

It will be understood that the attachment may be shifted to either side of the beam—as, for instance, in first cultivating the rows the attachment may be placed at the right of the beam and in the second cultivation at the left of the beam, or vice versa, thus producing a cross-hatch disturbance of the soil and insuring all weeds being removed.

It will be observed that the harrow is in advance of the plow and operates independently of the plow and that the harrow-teeth prevent the clods and excess of dirt from falling on the plants and covering them up.

Having thus described my invention, I claim as new and desire to secure by Letters Patent—

1. A harrow attachment for plows, consisting of a crank-axle, a clip at one end of the axle and a pair of cultivator-wheels mounted to turn upon the axle, each wheel comprising two disks, teeth held between the disks and extending radially beyond their peripheries, bolts passed through the disks of the two wheels, and spacing-sleeves upon the bolts, engaging with the inner disks of the wheels, as described.

2. The combination with the beam, share or blade and handles of a cultivator or plow, and a bar connecting the said handles, of a harrow attachment, consisting of an axle extending beyond the left-hand side of the beam with a rearward inclination, the axle being at an obtuse angle to the said beam, a clip located at the right-hand end of the axle loosely receiving the beam, an adjusting-bar connected with the left-hand end of the axle and adjustably attached to the handle-sections of the machine, a pair of spiked wheels mounted to turn loosely on the said axle, each wheel consisting of opposing disks, spikes held between the disks of each wheel, extending radially beyond their peripheral edges, the left-hand sides of the spikes at their outer ends being beveled, and locking-bolts connecting the wheels passed through the disks thereof, and spacing devices for the said wheels, carried by the locking-bolts and having bearing at their ends against the inner disks of the wheels, all combined for operation substantially as described.

In testimony whereof I have signed my name to this specification in the presence of two subscribing witnesses.

JOHN COLEMAN FOOSHE.

Witnesses:
M. B. LIPSCOMB,
E. L. HISTER.